United States Patent [19]

Stephens

[11] 4,343,091

[45] Aug. 10, 1982

[54] THREE-DIMENSIONAL DRAWING TOOL

[76] Inventor: Peter H. Stephens, 636 Stanyan St., San Francisco, Calif. 94117

[21] Appl. No.: 245,306

[22] Filed: Mar. 19, 1981

[51] Int. Cl.³ ............................................. B43L 13/00
[52] U.S. Cl. .................................................... 33/18 R
[58] Field of Search .................. 33/18 R, 23 C, 23 F, 33/23 R

[56] References Cited

U.S. PATENT DOCUMENTS

| | | | |
|---|---|---|---|
| 2,561,436 | 7/1951 | Bachmann | 33/27 |
| 3,055,113 | 9/1962 | Grandjean | 33/18 R |
| 3,468,032 | 9/1969 | Smith | 33/27 |
| 3,760,505 | 9/1973 | Clark | 33/18 R |
| 4,251,920 | 2/1981 | Cassagnes | 33/174 B |

OTHER PUBLICATIONS

"The Intelligent Eye", pp. 132–136, 1970, McGraw-Hill Book Co.
"Skedoodle", 1979, Hasbro Industries, Inc.

Primary Examiner—Charles E. Phillips
Attorney, Agent, or Firm—Phillips, Moore, Lempio & Finley

[57] ABSTRACT

A drawing tool comprises a pair of transparent screens each defining a drawing surface on the underside thereof. A powderized etching composition is contained in a closed and sealed chamber beneath each drawing surface to fully coat the surface upon shaking of the drawing tool. An operator-controlled joy stick can be manipulated universally to simultaneously move drawing points along the drawing surfaces to scribe nearly identical two-dimensional designs thereon. An optical viewer mounted upon the screens enables the operator to stereoscopically view the individual images created by the designs as a three-dimensional image.

38 Claims, 9 Drawing Figures

THREE-DIMENSIONAL DRAWING TOOL

DESCRIPTION

1. Technical Field

This invention relates generally to a drawing tool for creating three-dimensional images, and more particularly to a drawing tool for etching individual two-dimensional designs on screens and for stereoscopically viewing the images as a composite three-dimensional image.

2. Background Art

The advent of three-dimensional imaging in the mass visual media, such as 3-D movies and holography, has dictated the need for a three-dimensional drawing tool for use as an educational instrument to develop stereoscopic vision sensitivity, spatial perception, and the ability to draw in three dimensions. A tool of this type could also be used for entertainment purposes to provide a novel outlet for personal visual expression. It is further desirable that the cost of the drawing tool be kept at a minimum to make it available to a wide segment of the population. Also, the drawing field should exhibit a substantially wide angle of view to enable the tool to effect a wide variety of designs and the like.

Various toys on the market now exhibit the capability of providing a two-dimensional image by scribing a pattern on a screen that is coated with a composition composed of powdered metal. When the operator desired to inscribe a new design on the screen, he merely shakes the toy to recoat the screen with the metallicized composition. Such toys do not exhibit the above-mentioned stereoscopic capabilities and oftentimes employ a curve surface on the screen which accentuates the lines inscribed thereon to thus distort the desired image.

DISCLOSURE OF INVENTION

An object of this invention is to provide an economical and highly reliable three-dimensional drawing tool that exhibits a wide angle of view. The drawing tool comprises a pair of transparent screens, an etching composition composed of powdered metal normally coating the lower or drawing sides of the screens, scribing means for simultaneously scribing nearly identical designs on the coating, operator control means for simultaneously moving the scribing means to etch the desired designs on the screens, and optical viewing means for stereoscopically viewing the individual images resulting from the designs as a composite three-dimensional design.

BRIEF DESCRIPTION OF THE DRAWINGS

Other objects and advantages of this invention will become apparent from the following description and accompanying drawings wherein.

BEST MODE OF CARRYINNG OUT THE INVENTION

General Description

Figure 1:
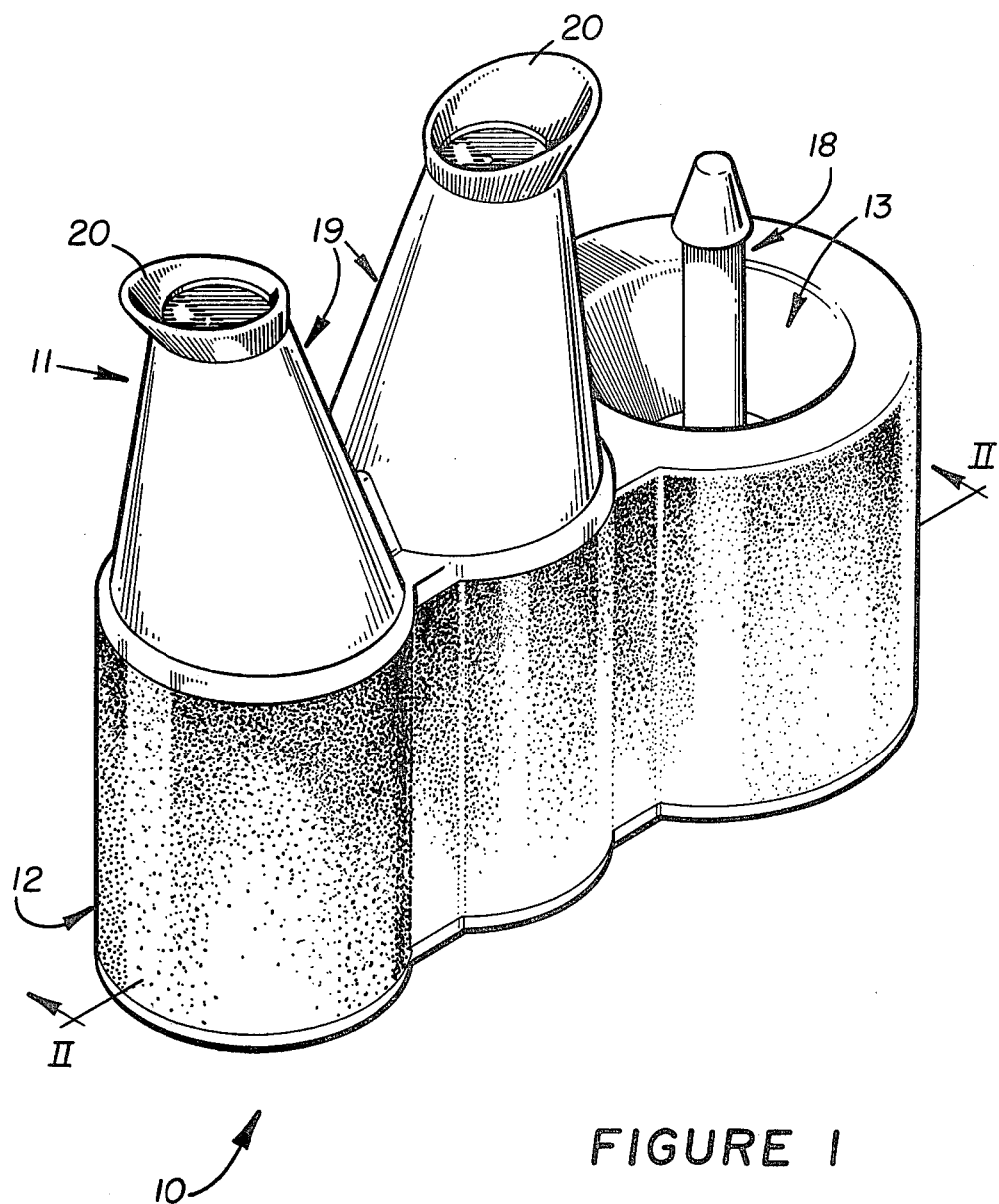
FIG. 1 is an isometric view of a three-dimensional drawing tool embodying this invention.
Figure 2:
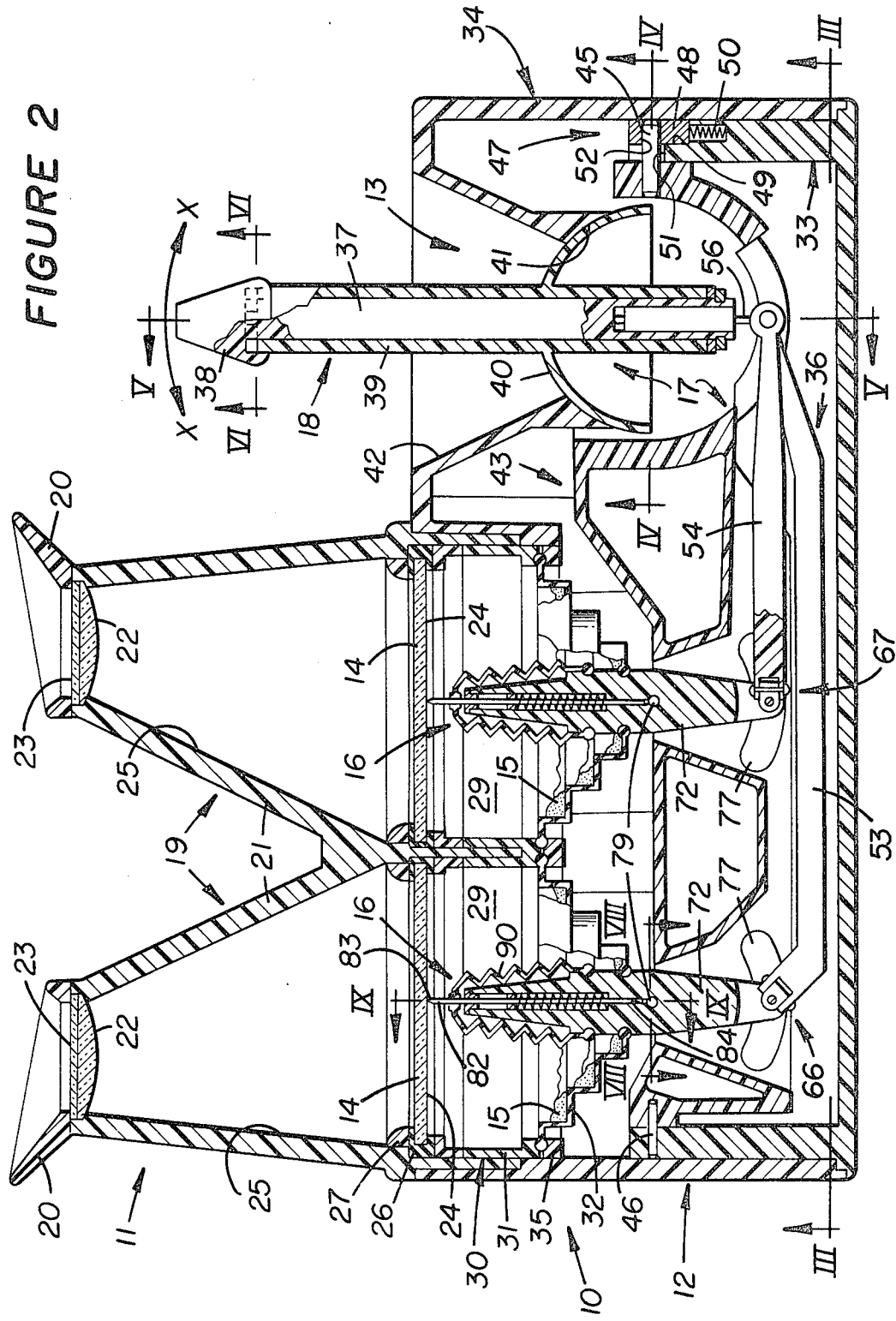
FIG. 2 is an enlarged longitudinal sectional view through the drawing tool, taken in the direction of arrows II—II in FIG. 1.

FIGS. 1 and 2 illustrate a three-dimensional drawing tool 10 essentially comprising the following three modules: (1) an optical viewing module 11; (2) a housing module 12; and (3) a drawing module 13. This modular makeup of the drawing tool, as described more specifically hereinafter, facilitates expeditious assembly and disassembly for servicing or repair purposes.

Optical viewing module 11 comprises a pair of flat transparent screens 14, preferably in the form of glass plates, adapted to have undersides or drawing surfaces thereof normally fully coated with an etching composition 15 composed of a powdered metal, such as bronze or aluminum, intermixed with small (e.g., 1.0 mm in diameter) plastic or glass beads. This type of composition, well known in the art, will adhere to the undersides of screens 14 to form an opaque or translucent coating thereon, having a substantially constant thickness, upon shaking of the drawing tool. Drawing module 13 comprises a pair of scribing means 16 for simultaneously scribing identical two-dimensional designs on the coating in response to manipulation of an operator control means 17, including a joy stick 18.

An optical viewing means 19 is positioned above each screen 14 for stereoscopically viewing the individual images resulting from the designs etched on the screens, as a composite three-dimensional image. The designs effected by scribing means 16 result from a sweeping-away of the etching composition to visually create a dark line against the ligher, reflective surface of the remaining metallicized composition. Thus, the operator is enabled to view a separate image with each eye, representing slightly different views of the same image, and is further enabled to see them stereoscopically, as a three-dimensional image.

DETAILED DESCRIPTION

Optical Viewing Module 11

Each optical viewing means 19 of optical viewing module 11 comprises a cup-shaped, opaque eyepiece 20, composed of plastic or rubber. The eyepiece is secured on the outer end of a transparent tubular support 21, generally in the shape of a truncated cone and composed of a translucent plastic material. A plastic or ground glass plano-convex convergent lens 22 is secured in place between the eyepiece and support, along with a glass cover plate 23 for protecting the lens.

Each lens 22 is suitably shaped to focus in a flat plane containing an underside or drawing surface 24 of a respective screen 14. The relationship between the focal lengths of the lens and the drawing surfaces are preselected for ease of fusion of the two images seen by the eyes of the operator into the resulting composite, three-dimensional image resulting therefrom. As mentioned above, supports 21 are transparent to emit light therethrough and onto screens 14.

In essence, the natural condition in which the point at which the two eyes converge is recreated and the eyes each separately focus on this point. Another consideration affecting the optical design parameters of the drawing tool is that the viewer has a greater ability to fuse stereoscopic discrepancies into three-dimensional space, the closer the overall scene appears to the viewer. In one application, the drawing tool was designed to center its apparent three-dimensional depth at a close-in mean of twenty (20) inches, i.e., a line drawn at its middlemost spatial setting will appear to be twenty (20) inches away. Because of the previously-mentioned need for the binocular convergence point and the eye focus distance to coincide, the focal length of the lenses must be somewhat longer than the distance from the lenses to the image plane so that the eyes will accommodate to a focus equivalent to focusing on an object twenty (20) inches away.

In creating three-dimensional depth with the drawing tool, the binocular convergence point will necessarily vary around the mean while the focus will remain constant. Thus, as the binocular convergence deviates from the mean, the eyes will deviate from their normal and habitual coordination. However, since the focus and binocular convergence are substantially synchronized, such deviation will not present any meaningful optical difficulty and the viewer will readily adapt thereto.

Translucent lens support 21 has a standard, diffused inner surface 25 to diffuse all incoming ambient light and uniformly light-up drawing surface 24. Circular glass screen 14 is secured in place on a lower end of support 21 by an annular elastomeric sealing gasket 26 and a pair of plastic rings 27 and 28. Gasket 26 seals etching composition 15 within a closed chamber 29 and also absorbs shock loads imposed on the drawing tool to prevent breakage of glass screen 14.

A unitary support element 30 for securing and supporting unitized supports 21 thereon comprises a pair of opaque plastic rings 31. The support element aids in defining chambers 29 and is seated at its lower end on beaded peripheries of elastomeric (rubber) bellows-type seals 32. Chambers 29 are thus isolated from light to enhance the contrast between the lines drawn on surface 24 by scribing means 16 and the etching composition thereon.

Housing Module 12

Housing module 12 essentially comprises a base portion 33, having drawing module 13 secured thereon, and a body portion 34, having optical viewing module 11 mounted thereon. In general, the body portion is secured on the base portion in telescopic relationship therewith, whereafter seals 32 are mounted in place, as shown in FIG. 2. Optical viewing module 11 is then inserted downwardly into telescopic relationship within body portion 34 to compress the beaded periphery of gaskets 32 between the lower end of ring 31 and a retaining plate 35, secured on the body portion.

The base and body portions comprising housing module 12 may be composed of a standard impact-resistant plastic material. The base and body portions, as well as other relatively stationary plastic components of the drawing tool, can be suitably secured together by a standard adhesive and/or heat sealed in a conventional manner. Alternatively, set screws or the like can be employed to secure the base and body portions together, as well as optical viewing module 11 on the body portion, to facilitate disassembly for servicing or repair purposes.

Drawing Module 13

Figure 3:
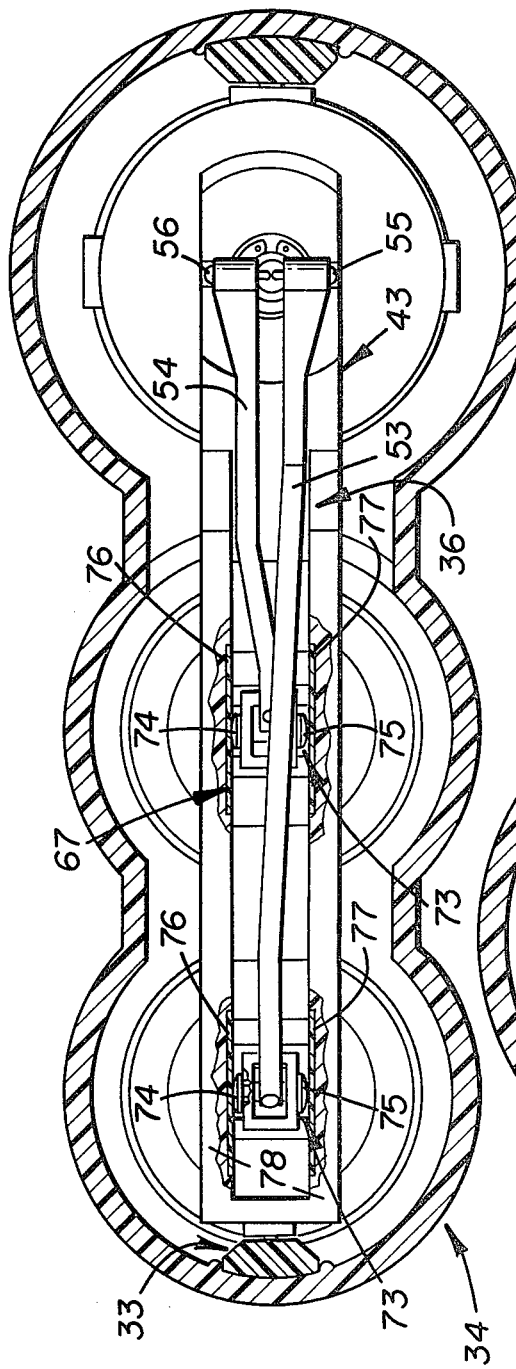
FIG. 3 is a bottom plan sectional view of the drawing tool, taken in the direction of arrows III—III in FIG. 2.

Referring to FIGS. 2 and 3, joy stick 18 of operator control means 17 is connected to each scribing means 16 by a linkage means 36 to selectively and simultaneously move the two scribing means for etching the desired designs on screens 14. The joy stick is adapted to be pivoted universally to move the scribing means in a first mode of movement depicted as direction X—X (FIG. 2), a second mode of movement depicted as direction Y—Y (FIG. 5), or any infinite number of directions therebetween, i.e., any desired combination of movements X—X and Y—Y. In addition, the joy stick can be rotated in a third mode of movement depicted as direction Z—Z (FIG. 6) to selectively vary the relative distance between the two scribing means, as described more fully hereinafter.

Joy stick 18 comprises a shaft 37 having a knob 38 secured on the upper end thereof for manipulation by an operator. Shaft 37 is rotatably mounted in a sleeve 39 having a spherical ball segment 40 secured adjacent to a lower end thereof to universally mount the joy stick in a spherical socket 41, defined in body portion 34 of the housing module. The ball and socket connection thus formed between the joy stick and the housing module facilitates universal manipulation of the joy stick within a frustoconically-shaped recess 42, also formed in the body portion of the housing module.

Figure 4:
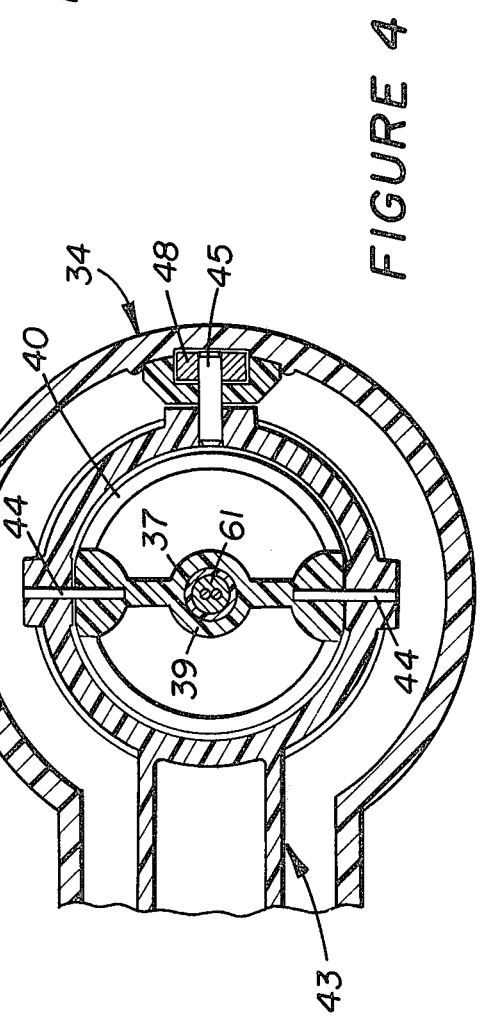
FIG. 4 is a bottom plan sectional view, taken in the direction of arrows IV—IV in FIG. 2.
Figure 5:
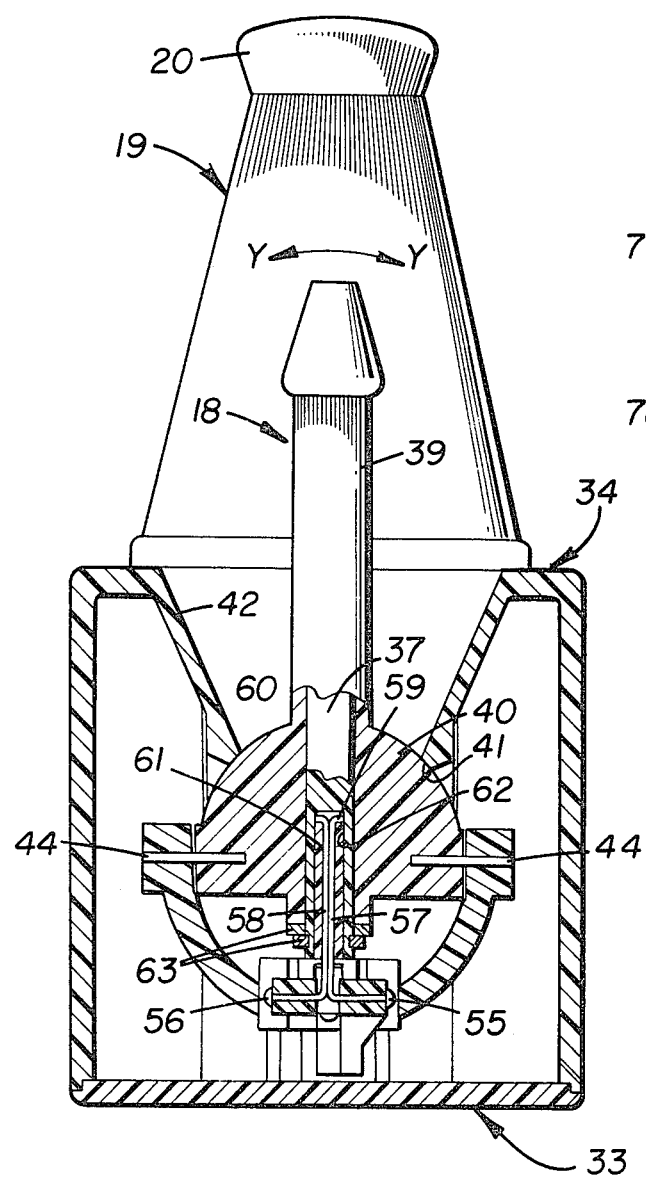
FIG. 5 is a sectional view, taken in the direction of arrows V—V in FIG. 2.
Figure 9:
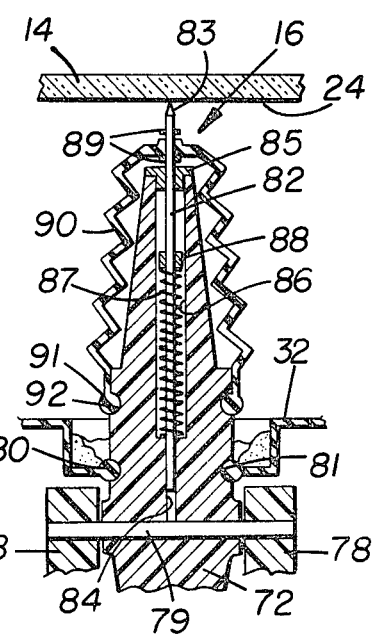
FIG. 9 is an enlarged sectional view, taken in the direction of arrows IX—IX in FIG. 2.

As shown in FIGS. 4 and 5, ball segment 40 is pivotally mounted on a axle assembly 43 by a pair of colinear pins 44, whereby the joy stick can be pivoted in direction X—X (FIG. 2), relative to the axle housing. As shown in FIGS. 2-4, axle housing 43 is pivotally mounted on base portion 33 of the housing module by a pair of longitudinally-spaced and colinear pins 45 and 46 disposed in the same horizontal plane as pins 44. Thus, pivotal movement of joy stick 18 in direction Y—Y in FIG. 5 will pivot the axle assembly about the axes of pins 45 and 46.

An immobilization means 47 is associated with pivot pin 45 to apply a frictional holding force to ball segment 40 upon release of joy stick 18 by the operator. Such means is particularly useful during the erasing procedure when the drawing tool is shaken by the operator to recoat drawing surface 24 to render it opaque. Means 47 comprises a bearing block 48 having an end of pin 45 rotatably mounted therein. The bearing block is reciprocally mounted in a slot 49, formed in base portion 33 of the housing module.

A compression coil spring 50 is mounted between the base portion and the bearing block to urge the bearing block and pin upwardly, as shown in FIG. 2. A U-shaped slot 51 is formed on the base portion to seat pin 45 therein and the pin is rotatably mounted in a through bore, formed in the bearing block. The pin is fixedly secured to axle 43.

As shown in FIG. 2, when no downward pressure is applied to joy stick 18 upon its release by the operator, spring 50 will function to bias block 48, pin 45, and axle assembly 43 upwardly to define a clearance between the pin and the bottom of slot 51. As shown in FIG. 5, the upward urging of the axle assembly will apply an upward force to pins 44 to thus urge the substantial outer surface of ball segment 40 into frictional engagement with socket 41 to immobilize joy stick 18 and, thus, linkage means 36 and scribing means 16, to facilitate shaking of the drawing tool to recoat drawing surfaces 24.

Conversely, when the operator presses down on the joy stick to commence a scribing operation, the frictional engagement between the ball and socket will be released to permit the joy stick to be freely manipulated. The operating clearance between the bearing surfaces of the ball and socket can be kept to a minimum. It should be further noted in FIG. 2 that sufficient flexure can be provided at the connection of pivot pin 46 between plastic base portion 43 and axle assembly 43 to allow the minimal deflection required by the axle assembly and attendant mechanisms at pin 45 to provide the above-described function of means 47.

As more clearly shown in FIGS. 2 and 3, linkage means 36 comprises a pair of links 53 and 54, each pivotally interconnected between joy stick 18 and a respective scribing means 16. As shown in FIG. 5, first ends of links 53 and 54 are pivotally mounted on pins 55 and 56, respectively. Pivot pins 55 and 56 are formed out of elongated rods which are suitably bent to provide vertical sections 57, 58, and bent portions 59, 60. Upon assembly, the rods, with portions 59 and 60 remaining in their unbent conditions, are inserted upwardly through a sleeve 61 whereafter bent portions 59 and 60 are formed, as shown in FIG. 5. This sub-assembly, including the sleeve and rods, is then inserted upwardly into a bore 62, formed in the lower end of shaft 37, and secured therein by a washer and retaining or snap ring 63, releasably secured to the sleeve.

Figure 6:
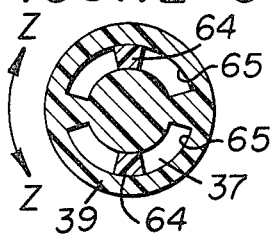
FIG. 6 is an enlarged sectional view, taken in the direction of arrows VI—VI in FIG. 2.

It can thus be seen in FIG. 2 that pivotal first mode of movement of joy stick 18 in direction X—X and about the pivot axes of pins 44 (FIG. 5) will function to move links 53 and 54 longitudinally. Pivotal second mode of movement of the joy stick in direction Y—Y in FIG. 5 about the pivot axes of pins 45 and 46 (FIG. 2) will function to pivot ball 40 and axle assembly 43 as a unit, with the pivot connection at pins 55 and 56 remaining static. Third mode of movement in direction Z—Z, namely rotation of shaft 37 of the joy stick about its longitudinal axis as shown in FIG. 6, will function to longitudinally displace links 53 and 54 relative to each other to thus change the relative distance between the drawing points of scribing means 16 to create changes in depth stereoscopically as a result of scribing nearly identical designs on the screens.

In particular, rotation of knob 38 in either direction will rotate shaft 37 to apply torsional or twisting movements to pin sections 57 and 58 (FIG. 5), which will tend to "roll" about their common center and the coincident longitudinal axis of shaft 37. As a result, links 53 and 54 will be accorded small movements in opposite directions (either away or towards each other, depending upon the direction of rotation of knob 38) to provide a minor but highly accurate and sensitive change in the distance between the drawing points of scribing means 14. This change will be maintained without any interference with the pivoting action of pins 53 and 56 when joy stick 18 is moved simultaneously in direction X—X (FIG. 2), for example. It should be noted in FIG. 6 that an upper end of sleeve 39 has a pair of diametrically opposed stops 64 thereon, each disposed within a circumferential groove 65 defined on the underside of knob 38. This arrangement will thus provide stop means limiting rotation of the knob and, thus, shaft 37, to 120°, for example.

Figure 7:
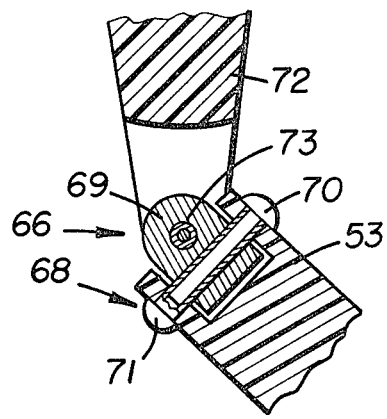
FIG. 7 is an enlarged sectional view of a pivot joint employed in the drawing tool.

As shown in FIGS. 2 and 3, the second ends of links 53 and 54 are pivotally connected to the individual scribing means 16 by pivot connections 66 and 67, respectively. Since the pivot connections and scribing means are substantially identical in construction and arrangement, only one of each will be described specifically. As shown in FIG. 7, pivot connection 66 comprises a pivot pin 68 for pivotally connecting a bifurcated end of link 53 to a link 69. As shown, pivot pin 68 may comprise a solid first pin 70, press-fitted into a hollow second pin 71. The opposite end of link 69 is pivotally connected within a lower, bifurcated end of a tubular member 72 of scribing means 16, by a second pivot pin 73 disposed in perpendicular relationship relative to pivot pin 68. Referring briefly to FIG. 3, pivot pin 73 may also comprise a pair of telescopically arranged and press-fitted first and second pins 74 and 75.

Figure 8:
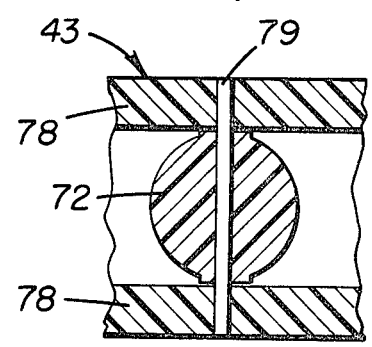
FIG. 8 is an enlarged sectional view, taken in the direction of arrows VIII—VIII in FIG. 2.

As shown in FIGS. 2 and 3, a pair of arcuate steel or Teflon bearing plates 76 and 77 are secured interiorly on a pair of laterally spaced rail portions 78 of axle assembly 36 to engage the heads of pins 74 and 75 to guide the longitudinal movements of link 53 and to prevent lateral displacement of links 53 relative to the axle assembly. This rail arrangement will further function to prevent any adverse lateral movement or twisting of tubular member 72 (FIG. 8). A similar arrangement is provided for link 54, as further shown in FIG. 3.

As shown in FIGS. 2 and 8, member 72 is pivotally mounted between the rail portions of axle assembly 43 by a pivot pin 79 which is disposed in parallel relationship relative to pivot pin 73. Thus, reciprocal movements of link 53, in response to movement of joy stick 18 in direction X—X in FIG. 2, will function to pivot member 72 in such direction. An annular inner bead 80 of gasket 32 is suitably mounted within an annular recess 81 formed on member 72 to provide a seal thereat to prevent the egress of etching composition 15 thereby. Scribing means 16 further comprises a steel pin or scriber 82, terminating at its upper end at a drawing point 83 for inscribing the desired design on the coated drawing surface 24 of screen 14.

A lower end of the pin is closely fitted within a bore 84 formed in member 72 for reciprocation therein in response to manipulation of joy stick 18 in directions X—X and/or Y—Y. Reciprocal movement of the upper end of the pin is guided by a steel bushing 85 secured on an upper end of member 72 to close-off an enlarged bore 86, communicating with and centrally disposed relative to bore 84. A compression coil spring or biasing means 87 is disposed in bore 86 and is mounted between member 72 and a collar 88 secured on the pin to constantly urge point 83 of the pin into engagement with drawing surface 24.

Collar 88 is suitably positioned on pin 82 and the length of bore 84 is predesigned to permit drawing point 83 of the pin to be biased outwardly into engagement with the outermost areas of drawing surface 24, upon manipulation of joy stick 18. If so desired, washers 89 can be suitably secured on pin 82 and disposed on either side of the upper end of an elastomeric bellows-type seal 90, to hold the seal in place at this end. The opposite end of the seal has an annular bead 91 suitably mounted within an annular groove 92, formed on member 72. Each chamber 29 is thus completely sealed and isolated.

In one embodiment of this invention, joy stick 19 exhibited a total angular movement in both the X—X and Y—Y directions of approximately 50°, as dictated and limited by frustoconically-shaped recess 42. Drawing points 83 will have a larger degree of movement in the X—X direction due to the relative distance changes afforded to them by means of selective rotation of shaft 37 of the joy stick in direction Z—Z (FIG. 6). Assuming that the joy stick is disposed vertically in its mid-position, as shown in FIG. 2, rotation of knob 38 in direction Z—Z and through an arc of 60° will function to tilt each drawing point 3° from its vertical disposition so that it will tilt-over to a maximum total of 28°. Thus, the maximum horizontal angular distance is increased to a total of 56° as opposed to the joy stick's total of 50°. The movements of the joy stick and drawing points in direction Y—Y, however, will remain the same, e.g., 50° total angular movement.

I claim:

1. A three-dimensional drawing tool comprising a housing,
    first and second transparent screens mounted on said housing, each having upper and lower sides,
    a powderized etching composition, normally coating the lower sides of said first and second screens,
    first and second scribing means for simultaneously scribing individual designs on the etching composition coating the lower sides of said first and second screens, respectively,
    operator control means for simultaneously moving and for also moving said first and second scribing means relative to each other in a preselected direction on the lower sides of said first and second screens to etch nearly identical said designs thereon, and
    first and second optical viewing means in alignment respectively with said first and second screens for stereoscopically viewing the individual images resulting from said individual designs as a composite three-dimensional image.

2. The drawing tool of claim 1 wherein each of said first and second transparent screens is flat.

3. The drawing tool of claim 2 wherein each of said first and second transparent screens is mounted at a lower end of a transparent tubular support and wherein a convergent lens is mounted on an upper end of each said support.

4. The drawing tool of claim 1 wherein said operator control means comprises a joy stick and linkage means, interconnecting said joy stick with said first and second scribing means, for selectively and simultaneously moving said first and second scribing means in a first direction, in a second direction perpendicular to said first direction, and infinite angular directions therebetween in response to manipulation of said joy stick.

5. The drawing tool of claim 4 wherein said linkage means is further interconnected between said joy stick and said first and second scribing means for selectively changing the distance between said first and second scribing means in said first direction in response to rotation of said joy stick about its longitudinal axis.

6. The drawing tool of claim 4 wherein said linkage means comprises first and second links pivotally connected to said first and second scribing means, respectively, and means for pivotally connecting said first and second links to said joy stick.

7. The drawing tool of claim 6 further comprising universal mounting means for universally mounting said joy stick on said drawing tool.

8. The drawing tool of claim 7 wherein said universal mounting means comprises a spherical ball segment secured to said joy stick and a spherical socket pivotally mounting said ball segment therein.

9. The drawing tool of claim 8 further comprising immobilization means for frictionally holding said ball segment in frictional engagement within said socket upon release of said joy stick by an operator and for releasing said frictional engagement upon depression of said joy stick by said operator.

10. The drawing tool of claim 6 wherein said linkage means further comprises an axle assembly, first pivot means for pivotally mounting said joy stick on said axle assembly for movement in said first direction, and second pivot means for pivotally mounting said axle assembly on said drawing tool for movement in said second direction.

11. The drawing tool of claim 5 wherein said linkage means comprises first and second links pivotally connected to said first and second scribing means, respectively, and connection means for pivotally connecting said first and second links to said joy stick.

12. The drawing tool of claim 11 wherein said joy stick includes a sleeve having a shaft rotatably mounted therein and wherein said connection means pivotally connects said first and second links to said shaft.

13. The drawing tool of claim 12 wherein said connection means includes a pair of pins each having vertical section mounted in said shaft in vertical alignment therewith, and a section forming a pivot pin pivotally mounting a respective one of said first and second links thereon, whereby rotation of said shaft relative to said sleeve will apply torsion to said vertical sections to displace said first and second links relative to each other.

14. The drawing tool of claim 12 further comprising stop means for limiting the rotation of said shaft relative to said sleeve.

15. The drawing tool of claim 4 wherein each of said first and second scribing means comprises a tubular member and means for pivotally mounting said tubular member on said drawing tool for movement in said first direction.

16. The drawing tool of claim 15 wherein said linkage means further comprises an axle assembly pivotally mounted in said drawing tool for pivotal movement in said second direction and wherein each said tubular member is pivotally mounted on said axle assembly for movement in said first direction.

17. The drawing tool of claim 16 wherein said joy stick is pivotally mounted on said axle assembly for movement in said first direction.

18. The drawing tool of claim 15 further comprising sealing means for engaging each said tubular member in sealing relationship therewith to define a closed chamber containing said powderized etching composition therein.

19. The drawing tool of claim 15 wherein each of said first and second scribing means further comprises a pin reciprocally mounted in each said tubular member, said pin terminating at its upper end at a scribing point engaging the lower side of a respective one of said first and second screens, and biasing means for urging the point of said pin into engagement with the lower side of said one screen.

20. A modular three-dimensional drawing tool comprising
    an optical viewing module including a pair of transparent tubular supports, each having a convergent lens mounted on an upper end thereof and a transparent screen mounted on a lower end thereof, a housing module including a base portion and a body portion, said optical viewing module mounted on said body portion, and said body portion mounted on said base portion, and a drawing module mounted on said base portion, including means for simultaneously scribing nearly identical individual designs on said screens whereby images created by said designs can be viewed stereoscopically through the lenses of said optical viewing module as a composite three-dimensional image.

21. The drawing tool of claim 20 wherein said last-mentioned means comprises a powderized etching composition, normally coating a lower side of each said screen, scribing means for scribing an individual design on the etching composition coating the lower side of each said screen, and operator control means for moving each said scribing means.

22. The drawing tool of claim 21 wherein each said screen is flat and each said lens is plano-convex.

23. The drawing tool of claim 21 wherein said operator control means comprises a joy stick and linkage means, interconnecting said joy stick with each said scribing means, for selectively moving each said scribing means in a first direction, in a second direction perpendicular to said first direction, and infinite angular directions therebetween in response to manipulation of said joy stick.

24. The drawing tool of claim 23 wherein said linkage means is further interconnected between said joy stick and each said scribing means for selectively changing the distance between the respective scribing means in said first direction and in response to rotation of said joy stick about its longitudinal axis.

25. The drawing tool of claim 23 wherein said linkage means comprises first and second links each pivotally connected to a respective one of said scribing means, and means for pivotally connecting said first and second links to said joy stick.

26. The drawing tool of claim 25 further comprising universal mounting means for universally mounting said joy stick on said drawing module.

27. The drawing tool of claim 26 wherein said universal mounting means comprises a spherical bell segment secured to said joy stick and a spherical socket pivotally mounting said ball segment therein.

28. The drawing tool of claim 27 further comprising immobilization means for frictionally holding said ball segment in frictional engagement within said socket upon release of said joy stick by an operator and for releasing said frictional engagement upon depression of said joy stick by said operator.

29. The drawing tool of claim 25 wherein said linkage means further comprises an axle assembly, first pivot means for pivotally mounting said joy stick on said axle assembly for movement in said first direction, and second pivot means for pivotally mounting said axle assembly on the base portion of said housing module for movement in said second direction.

30. The drawing tool of claim 24 wherein said linkage means comprises first and second links each pivotally connected to a respective one of said scribing means, and connection means for pivotally connecting said first and second links to said joy stick.

31. The drawing tool of claim 30 wherein said joy stick includes a sleeve having a shaft rotatably mounted therein and wherein said connection means pivotally connects said first and second links to said shaft.

32. The drawing tool of claim 31 wherein said connection means includes a pair of pins each having vertical section mounted in said shaft in vertical alignment therewith, and a section forming a pivot pin pivotally mounting a respective one of said first and second links thereon, whereby rotation of said shaft relative to said sleeve will apply torsion to said vertical sections to displace said first and second links relative to each other.

33. The drawing tool of claim 31 further comprising stop means for limiting the rotation of said shaft relative to said sleeve.

34. The drawing tool of claim 23 wherein each said scribing means comprises a tubular member and means for pivotally mounting said tubular member on said drawing module for movement in said first direction.

35. The drawing tool of claim 34 wherein said linkage means further comprises an axle assembly pivotally mounted on said base portion for pivotal movement in said second direction and wherein each said tubular member is pivotally mounted on said axle assembly for movement in said first direction.

36. The drawing tool of claim 35 wherein said joy stick is pivotally mounted on said axle assembly for movement in said first direction.

37. The drawing tool of claim 35 further comprising sealing means for engaging each said tubular member in sealing relationship therewith to define a closed chamber and a powderized etching composition contained in said chamber.

38. The drawing tool of claim 34 wherein each said scribing means further comprises a pin reciprocally mounted in each said tubular member, said pin terminating at its upper end at a scribing point engaging the lower side of a said screen, and biasing means for urging the point of said pin into engagement with the lower side of said screen.

* * * * *